United States Patent
Lin et al.

(10) Patent No.: US 12,477,473 B2
(45) Date of Patent: Nov. 18, 2025

(54) CROSS-BSS (BASIC SERVICE SET) NON-TRIGGERED BASED COORDINATED SPATIAL REUSE

(71) Applicant: MEDIATEK INC., Hsinchu (TW)

(72) Inventors: Ray-Kuo Lin, Hsinchu (TW); Tsungjung Lee, Hsinchu (TW); Pochun Fang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 449 days.

(21) Appl. No.: 18/155,306

(22) Filed: Jan. 17, 2023

(65) Prior Publication Data

US 2023/0239808 A1 Jul. 27, 2023

Related U.S. Application Data

(60) Provisional application No. 63/302,144, filed on Jan. 24, 2022.

(51) Int. Cl.
*H04W 52/24* (2009.01)

(52) U.S. Cl.
CPC ....... *H04W 52/245* (2013.01); *H04W 52/241* (2013.01)

(58) Field of Classification Search
CPC . H04W 52/245; H04W 52/241; H04W 84/12; H04B 17/25; H04B 17/318
USPC .......................... 370/310, 315, 316, 317, 318
See application file for complete search history.

(56) References Cited

U.S. PATENT DOCUMENTS

| | | | |
|---|---|---|---|
| 10,986,505 B2 | 4/2021 | Cherian et al. | |
| 11,013,031 B2 | 5/2021 | Park | |
| 2017/0064739 A1* | 3/2017 | Hedayat | H04L 5/0037 |
| 2017/0188376 A1* | 6/2017 | Noh | H04W 52/42 |

(Continued)

FOREIGN PATENT DOCUMENTS

| | | |
|---|---|---|
| EP | 3 890 216 A2 | 10/2021 |
| TW | 202139752 A | 10/2021 |

(Continued)

OTHER PUBLICATIONS

Extended European Search Report dated Jun. 13, 2023, issued in application No. EP 23152348.1.

(Continued)

*Primary Examiner* — Obaidul Huq
(74) *Attorney, Agent, or Firm* — McClure, Qualey & Rodack, LLP

(57) ABSTRACT

A device is provided, which includes a transceiver and a processor. The transceiver connects the device to one or more first stations and an access point, and the access point is connected to one or more second stations. The processor is coupled to the transceiver and is configured to perform operations including: building a first cross-BSS (basic service set) RSSI (received signal strength indication) measurement report; obtaining a second cross-BSS RSSI measurement report from the access point; in response to a link between the access point and at least one of the second stations being built, adjusting transmit power of the transceiver to satisfy a predetermined condition to transmit a data packet to one of the first stations using non-triggered base spatial reuse according to the first cross-BSS RSSI measurement report and the second cross-BSS RSSI measurement report.

20 Claims, 9 Drawing Sheets

(56) References Cited

U.S. PATENT DOCUMENTS

2019/0141749 A1     5/2019   Seok et al.
2021/0314879 A1   10/2021   Seok et al.
2021/0360694 A1*   11/2021   Pandian .............. H04W 72/541
2022/0338066 A1*   10/2022   Chitrakar ............ H04W 72/542

FOREIGN PATENT DOCUMENTS

WO     2021/141530 A1    7/2021
WO     2021/222374 A1   11/2021

OTHER PUBLICATIONS

Chinese language office action dated Jul. 17, 2023, issued in application No. TW 112102686.
Park, S., et al.; "Coordinated Spatial Reuse Procedure;" IEEE 802.11-20/0410r4; Mar. 2020; pp. 1-23.
Seok, Y., et al.; "Coordinated Spatial Reuse (C-SR) Protocol;" IEEE 802.11-20/0576r1; May 2020; pp. 1-21.

* cited by examiner

CROSS-BSS (BASIC SERVICE SET) NON-TRIGGERED BASED COORDINATED SPATIAL REUSE

CROSS REFERENCE TO RELATED APPLICATIONS

This application claims the benefits of U.S. Provisional Application No. 63/302,144 filed on Jan. 24, 2022, the entirety of which is incorporated by reference herein.

BACKGROUND OF THE DISCLOSURE

Field of the Disclosure

The present invention relates to wireless-network communications, and, in particular, to a device and a method using cross-BSS non-triggered based coordinated spatial reuse in a mesh network.

Description of the Related Art

IEEE 802.11 is a set of media access control (MAC) and physical layer (PHY) specifications for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significantly wider channel bandwidths (20 MHz, 40 MHz, 80 MHz, and 160 MHz) were proposed in the IEEE 802.11ac standard. The High Efficiency WLAN study group (HEW SG) is a study group within the IEEE 802.11 working group that will consider the improvement of spectrum efficiency to enhance the system throughput in high-density scenarios of wireless devices. Because of HEW SG, the TGax (an IEEE task group) was formed and tasked to work on the IEEE 802.11ax standard that will become a successor to IEEE 802.11ac. Recently, WLAN has seen exponential growth across organizations in many industries.

In IEEE 802.11ac WLAN systems, the transmitter of a BSS (basis service set) of a certain bandwidth is allowed to transmit radio signals into the shared wireless medium depending on clear channel assessment (CCA) sensing and a deferral or backoff procedure for channel access contention. An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals into the shared wireless medium. The basic assumption of EDCA is that a packet collision can occur if a device transmits signals under the channel busy condition when the received signal level is higher than the CCA level. This simple CSMA/CA with a random back-off contention scheme and low-cost ad hoc deployment in an unlicensed spectrum have contributed to the rapid adoption of IEEE 802.11ac Wi-Fi systems.

BSS Coloring is a technique used to improve co-existence of overlapping BSSs (OBSS) and to allow spatial reuse (SR) within one channel. Wi-Fi 6 (IEEE 802.11ax) enables each AP radio to assign a value (from 1 to 63), known as the BSS color, to be included in the physical (PHY) header of all high-efficiency (HE) transmissions from devices in its BSS. With devices of each BSS transmitting a locally-unique color, a device can quickly and easily distinguish transmissions from its BSS or from devices in a neighboring BSS.

Today, Wi-Fi devices are over-populated. Dense deployment has led to significant issues such as interference, congestion, and low throughput. The spatial reuse technique introduced in the IEEE 802.11ax protocol may lead to a significant increase in the network throughput in some dense deployment scenarios because more simultaneous transmissions can happen in multiple overlapping BSSs (OBSSs). Although the spatial reuse feature in Wi-Fi 6 may help mitigate co-channel interference, more usage of spatial reuse also introduces more collisions and interference into the networks. However, the spatial reuse feature in Wi-Fi 6 does not guarantee the reception performance of an existing link between an access point and a station in the mesh network. More specifically, the spatial reuse feature in Wi-Fi 6 only considers the AP-to-AP (access point to access point) RSSI (received signal strength indication) to adjust the power of the transmitter (i.e., Tx power), and it does not consider the SR SINR (signal-to-interference plus noise ratio) on an existing link between an access point and a station in the wireless network. This will cause a significant degradation on the SINR on the receiver of the existing link.

Accordingly, there is demand for a device and a method using cross-BSS non-triggered based coordinated spatial reuse in a mesh network to solve the aforementioned problem.

BRIEF SUMMARY OF THE DISCLOSURE

An embodiment of the present invention provides a device. The device includes a transceiver and a processor. The transceiver connects the device to one or more first stations and an access point, wherein the access point is connected to one or more second stations. The processor is coupled to the transceiver and is configured to perform operations comprising: building a first cross-BSS (basic service set) RSSI measurement report; obtaining a second cross-BSS RSSI measurement report from the access point; in response to a link between the access point and at least one of the second stations being built, adjusting the transmit power of the transceiver to satisfy a predetermined condition to transmit a data packet to one of the first stations using non-triggered base spatial reuse according to the first cross-BSS RSSI measurement report and the second cross-BSS RSSI measurement report.

Another embodiment of the present invention provides a method. The method includes the following steps: forming a mesh network using a first access point, a second access point, one or more first stations, and one or more second stations, wherein the first access point is connected to the first stations and the second access point, and the second access point is connected to the second stations; building first cross-BSS RSSI measurement report using the first access point; obtaining a second cross-BSS RSSI measurement report from the second access point; and in response to a link between the second access point and at least one of the second stations being built, adjusting transmit power of the first access point to satisfy a predetermined condition to transmit a data packet to one of the first stations using non-triggered base spatial reuse according to the first cross-BSS RSSI measurement report and the second cross-BSS RSSI measurement report.

Yet another embodiment of the present invention provides a device. The device includes a transceiver and a processor. The transceiver connects the device to one or more first stations and an access point, wherein the access point is connected to one or more second stations. The processor is coupled to the transceiver and is configured to perform operations comprising: measuring first RSSI information from a management frame, a control frame or a data frame sent from each first station and each second station to build a first cross-BSS RSSI measurement report; exchanging the first cross-BSS RSSI measurement report and a second cross-BSS RSSI measurement report between the device and the access point; in response to an opportunity to perform spatial use being found by the processor, adjusting a transmit power of the transceiver to satisfy a predetermined condition to transmit a data packet to one of the first stations using non-triggered base spatial reuse according to the first cross-BSS RSSI measurement report and the second cross-BSS RSSI measurement report.

BRIEF DESCRIPTION OF THE DRAWINGS

The present invention can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
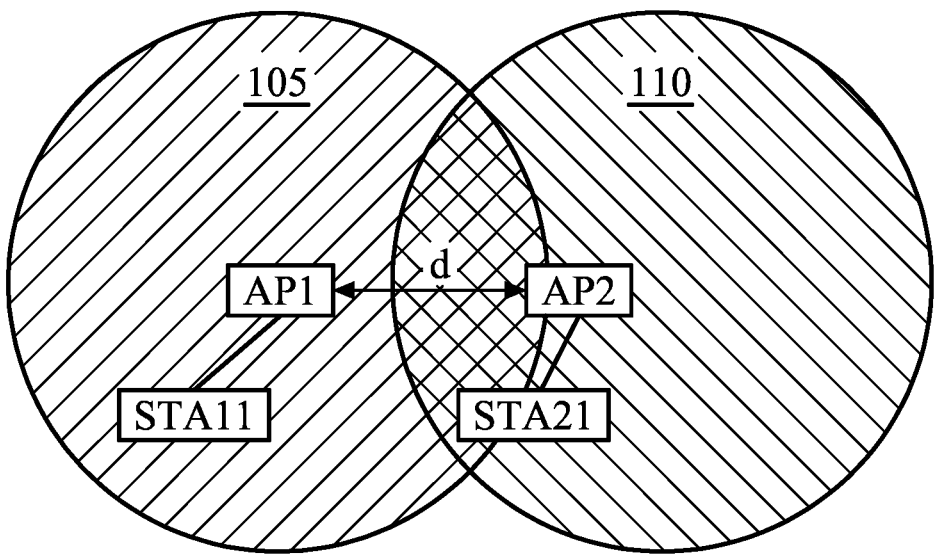
FIGS. 1A and 1B are diagrams illustrating overlapping BSSs operating on the same wireless channel using Wi-Fi 6 spatial reuse.
Figure 1B:
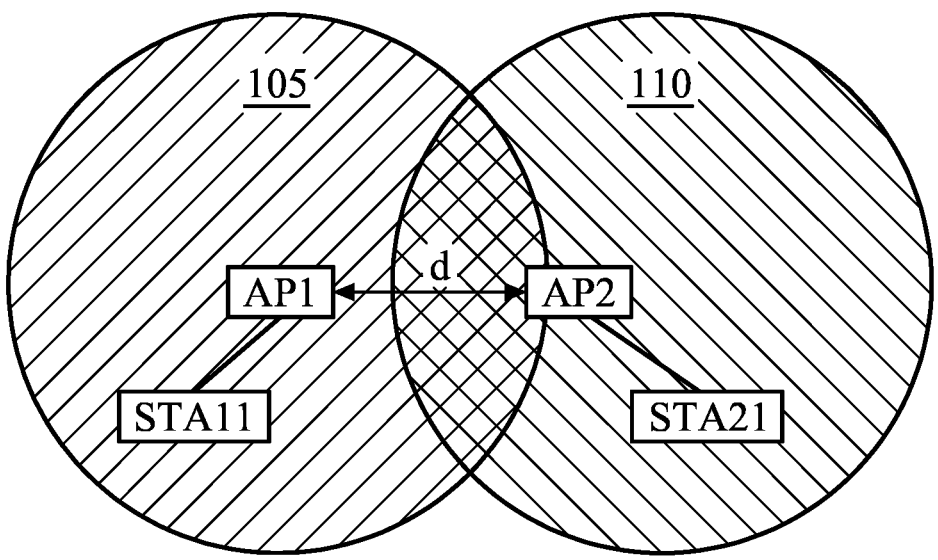

FIGS. 1A and 1B are diagrams illustrating overlapping BSSs operating on the same wireless channel using Wi-Fi 6 spatial reuse.

For example, as shown in FIG. 1, the Wi-Fi 6 compatible mesh network includes access points AP1 and AP2, and stations STA11 and STA21. In this scenario, the distance between the access points AP1 and AP2 is d. When the access point AP1 detects that a first packet is transmitted for the BSS 110, the access point AP1 can continue to transmit a second packet for BSS 105 if the signal strength of the first packet is below a predetermined threshold according to the spatial reuse protocol. In addition, when the access points AP1 and AP2 are configured to perform coordinated spatial reuse (C-SR), the access point AP1 can coordinate the transmit power (Tx power) of the access point AP2 so that the access points AP1 and AP2 can operate simultaneously without causing substantial interference between APs. In addition, there is an existing link between the access point AP2 and station STA21, and there is a spatial-reuse link between the access point AP1 and station STA11.

When the access point AP1 is to transmit data to the station STA11, the access point AP1 will consider the RSSI received from the access point AP2 without considering the RSSI received from the station STA21. When the access point AP1 adjust the transmit power (Tx power) for the SR link according to the RSSI received from the access point AP2, it will cause a significant degradation on the SINR on the existing link between the access point AP2 and station STA21 because the station STA21 is closer to the access point AP1 than the access point AP2.

In another scenario, as shown in FIG. 1B, the configuration of the mesh network in FIG. 1B is similar to that in FIG. 1A, and the difference between FIG. 1A and FIG. 5B is that the station STA21 is farther away from the access point AP1 than the access point AP2. When the access point AP1 adjust the Tx power for the SR link according to the RSSI received from the access point AP2, it will cause less impact on the SINR on the existing link between the access point AP2 and station STA21 because the station STA21 is farther away from the access point AP1 than the access point AP2.

Cross-BSS Triggered Based Spatial Reuse

Figure 2A:
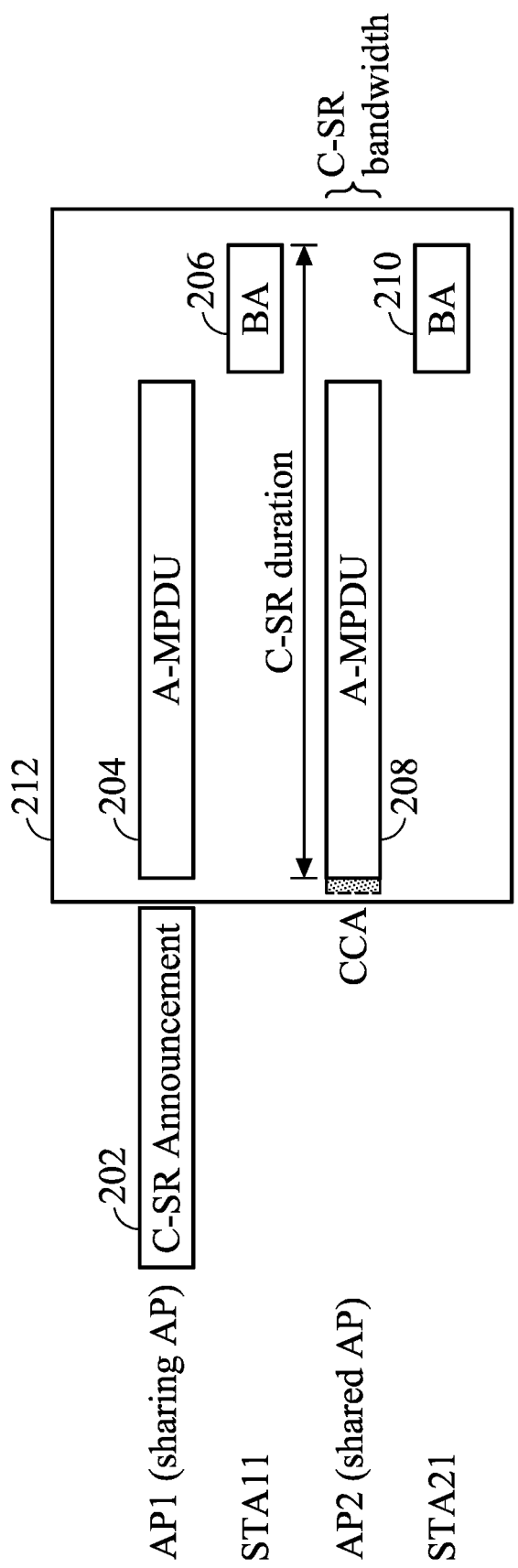
FIGS. 2A and 2B are diagrams showing cross-BSS triggered based spatial reuse in accordance with an embodiment of the disclosure.
Figure 2B:
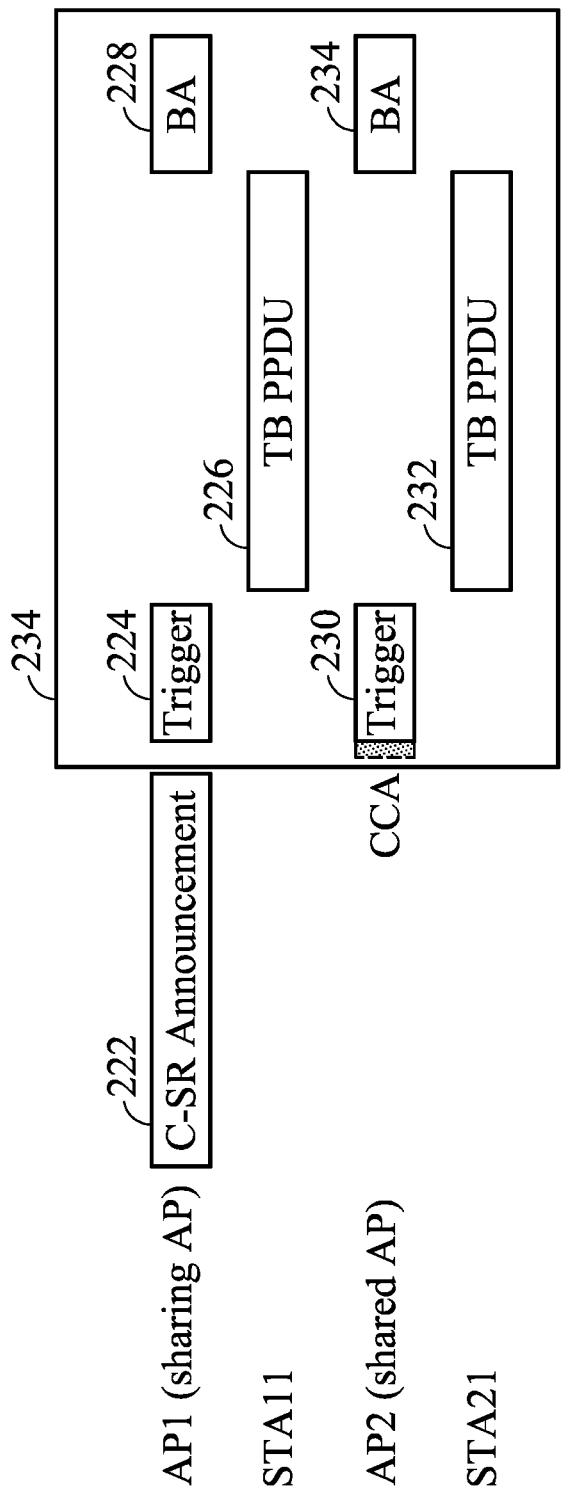

FIGS. 2A and 2B are diagrams showing cross-BSS triggered based spatial reuse in accordance with an embodiment of the disclosure. Please refer to FIG. 1A and FIGS. 2A-2B.

In an embodiment, before performing AP-to-AP spatial reuse, the initiator (e.g., access point AP1 or AP2), which is going to share spatial reuse opportunities, will send an announcement frame that is followed by the spatial reused data packet sequence to trigger other BSSs to start sharing their transmission opportunities (TXOPs). For convenience of description, it is assumed that the access point AP1 is a sharing AP (i.e., sharing its spatial reuse opportunities), and the access point AP2 is a shared AP.

Referring to FIG. 2A, the access point AP1 sends a C-SR announcement frame 202 to the access point AP2. After sending the C-SR announcement frame 202, the access point AP1 starts to transmit an A-MPDU (aggregate MAC Protocol Data Unit) 204 to the station STA11. In response to the A-MPDU 204, the station STA11 will respond a first block acknowledgement (BA) 206 to the access point AP1 to end the transmission session. In addition, in response to the C-SR announcement frame 202, the access point AP2 starts to perform clear-channel assessment (CCA) to ensure the current wireless channel is not in use by any other device, and then transmits another A-MPDU 208 to the stations in BSS 110 when the current wireless channel is not in use. In response to the A-MPDU 208, the station STA21 will respond another block acknowledgement 210 to the access point AP2 to end the transmission session.

Specifically, in FIG. 2A, the C-SR announcement frame 202 sent by the access point AP1 can be regarded as a cross-BSS announcement frame which is used as a trigger to initialize coordinated spatial reuse between the access points AP1 and AP2. In addition, the CCA, the A-MPDUs 204 and 208, and BAs 206 and 210 can be collectively regarded as a spatial reuse data packet sequence 212. In addition, the time interval from sending the C-SR announcement frame 202 to the end of the spatial reuse data packet sequence 212 is fixed.

Referring to FIG. 2B, the access point AP1 sends a C-SR announcement frame 222 to the access point AP2. After sending the C-SR announcement frame 222, the access point AP1 starts to transmit a trigger frame 224 to the station STA11. In response to trigger frame 224, the station STA11 will respond a TB PPDU (trigger-based physical layer protocol data unit) 226 to the access point AP1. In response to the TB PPDU 226, the access point AP1 will respond a block acknowledgement 228 to the station STA11 to end the transmission session.

In addition, in response to the C-SR announcement frame 222, the access point AP2 starts to perform clear-channel assessment (CCA) to ensure the current wireless channel is not in use by any other device, and then transmits another trigger frame 230 to the stations in BSS 110 when the current wireless channel is not in use. In response to the trigger frame 230, the station STA21 will respond another TB PPDU 232 to the access point AP2. In response to the TB PPDU 232, the access point AP2 will respond another block acknowledgement 234 to the station STA21 to end the transmission session.

Specifically, in FIG. 2B, the C-SR announcement frame 222 sent by the access point AP1 can be regarded as a cross-BSS announcement frame which is used as a trigger to initialize coordinated spatial reuse between the access points AP1 and AP2. In addition, the CCA, the trigger frames 224 and 230, the TB PPDUs 226 and 232, and BAs 228 and 234 can be collectively regarded as a spatial reuse data packet sequence 234. In addition, the time interval from sending the C-SR announcement frame 222 to the end of the spatial reuse data packet sequence 234 is fixed.

Cross-BSS Non-Triggered Based Spatial Reuse

Figure 3:
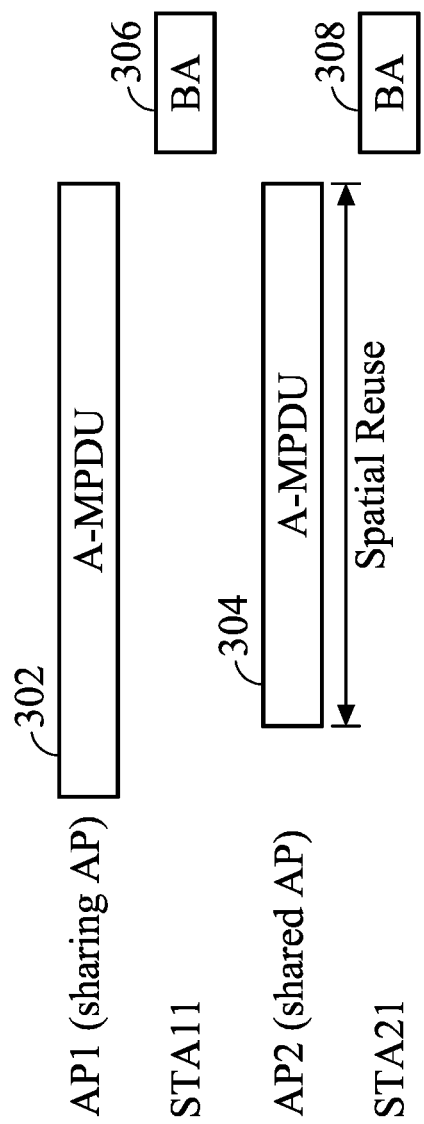
FIG. 3 is a diagram showing cross-BSS non-triggered based spatial reuse in accordance with an embodiment of the disclosure.

FIG. 3 is a diagram showing cross-BSS non-triggered based spatial reuse in accordance with an embodiment of the disclosure. Please refer to FIG. 1A and FIG. 3. Non-triggered base spatial reuse means that the device (e.g. access point AP1 or access point AP2) may decide the spatial reuse transmission (SR Tx) behavior by itself without receiving any trigger frame prior to SR Tx.

For convenience of description, it is assumed that the access point AP1 is a sharing AP (i.e., sharing its spatial reuse opportunities), and the access point AP2 is a shared AP. In another embodiment, before performing AP-to-AP spatial reuse, the initiator (e.g., access point AP1 or AP2), which is going to share spatial reuse opportunities, will not send an announcement frame that is followed by the spatial reused data packet sequence to trigger other BSSs to start sharing their transmission opportunities (TXOPs).

For example, the access point AP1 may directly send an A-MPDU 302 to the station STA11 in BSS 105. In response to the A-MPDU 302 sent by the access point AP1, the access point AP2 may then send another A-MPDU 304 to the stations in BSS 110 for spatial reuse. Specifically, the access point AP2 may detect the preamble of the A-MPDU 302 to obtain information about the BSS used by the access point AP1. When the detected BSS used by the access point AP1 is different from the BSS used by the access point AP2, the access point AP2 may start to send the A-MPDU 304 to the stations in BSS 110 for spatial reuse. It should be noted that the A-MPDU 304 and part of the A-MPDU 302 can be respectively transmitted by the access points AP2 and AP1 at the same time, so as to achieve spatial reuse.

Cross-BSS Non-Triggered Based Coordinate Spatial Reuse

Figure 4A:
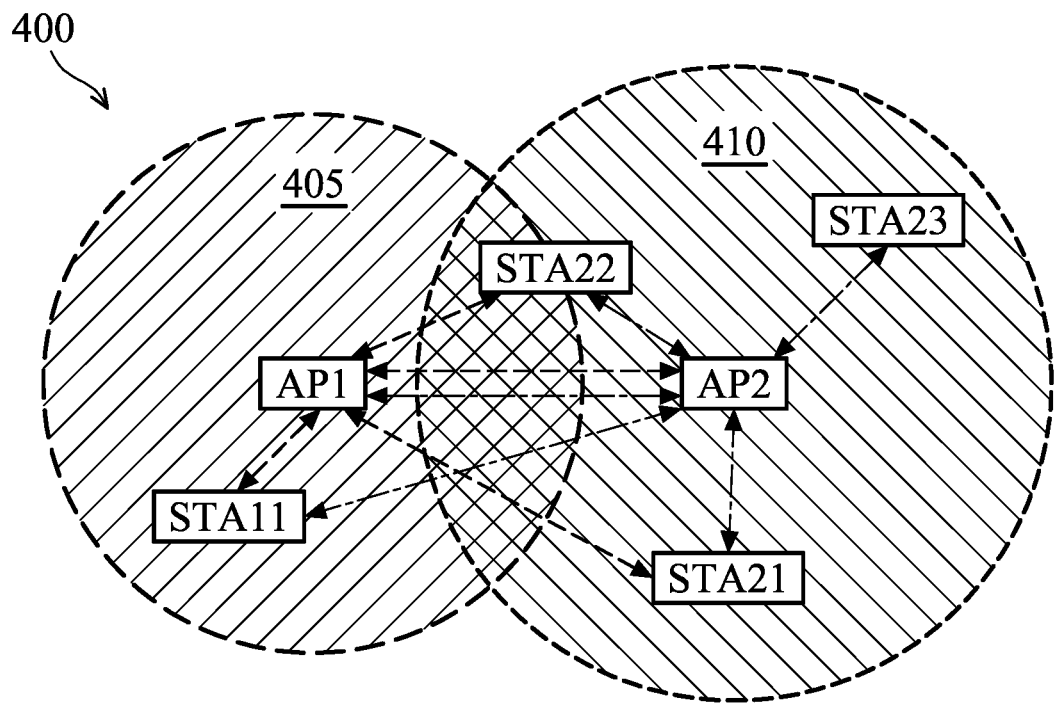
FIG. 4A is a diagram illustrating overlapping BSSs operating on the same wireless channel using coordinated spatial reuse in accordance with an embodiment of the disclosure.
Figure 4B:
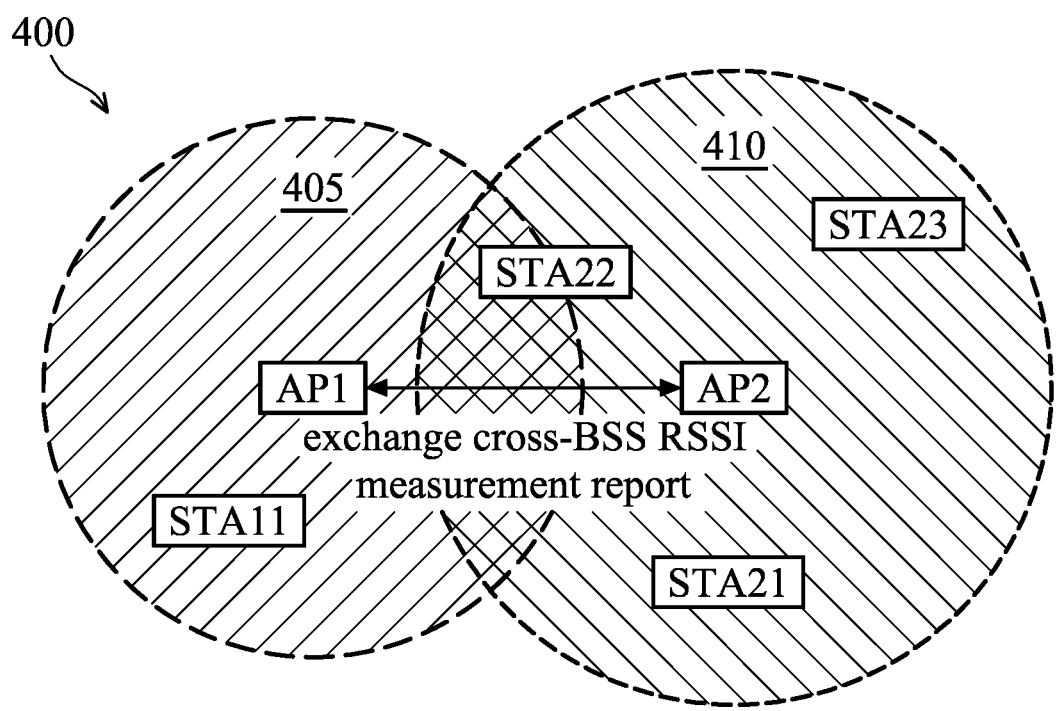
FIG. 4B is a diagram illustrating exchanging the cross-BSS RSSI measurement information between the access points AP1 and AP2 in accordance with the embodiment of FIG. 4A.
Figure 4C:
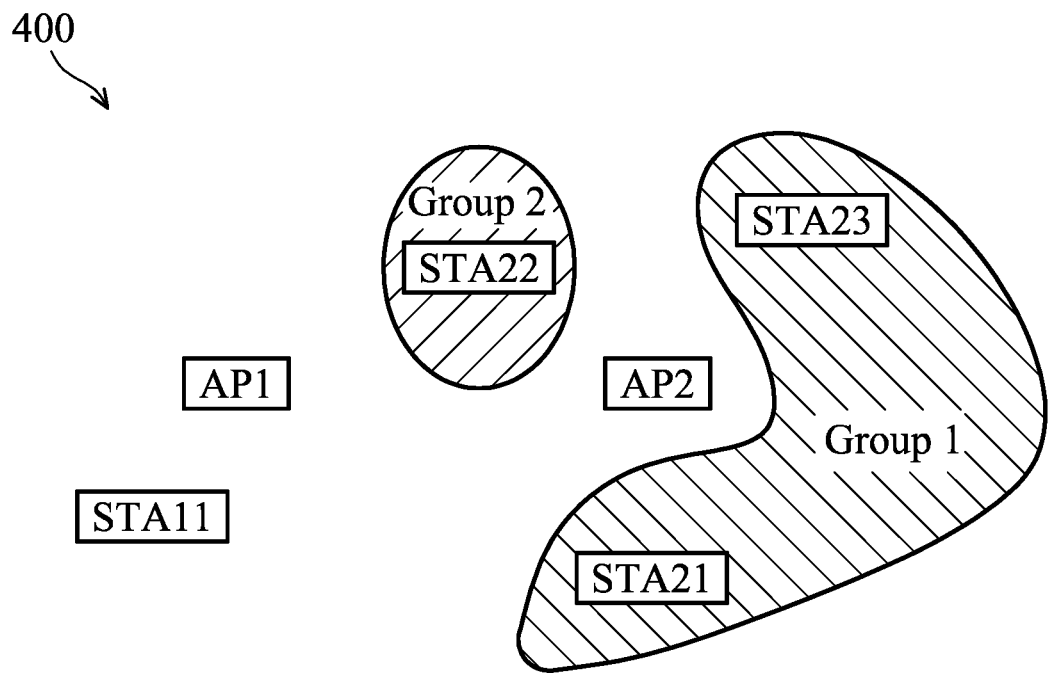
FIGS. 4C-4E are diagrams of group classification of stations in accordance with the embodiment of FIG. 4A.
Figure 4D:
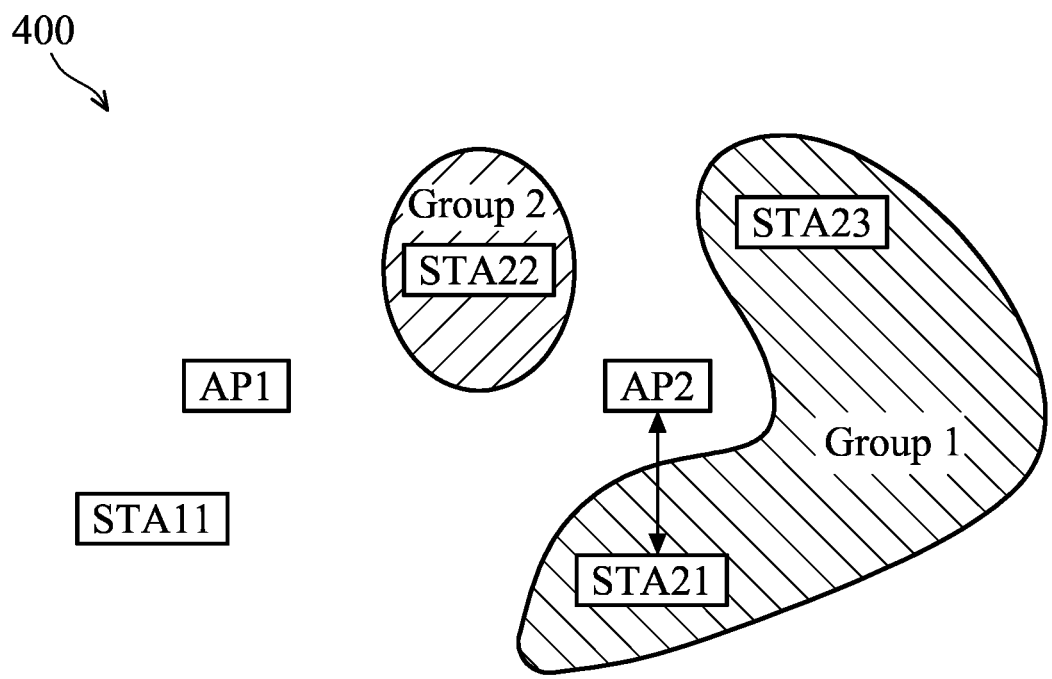
Figure 4E:
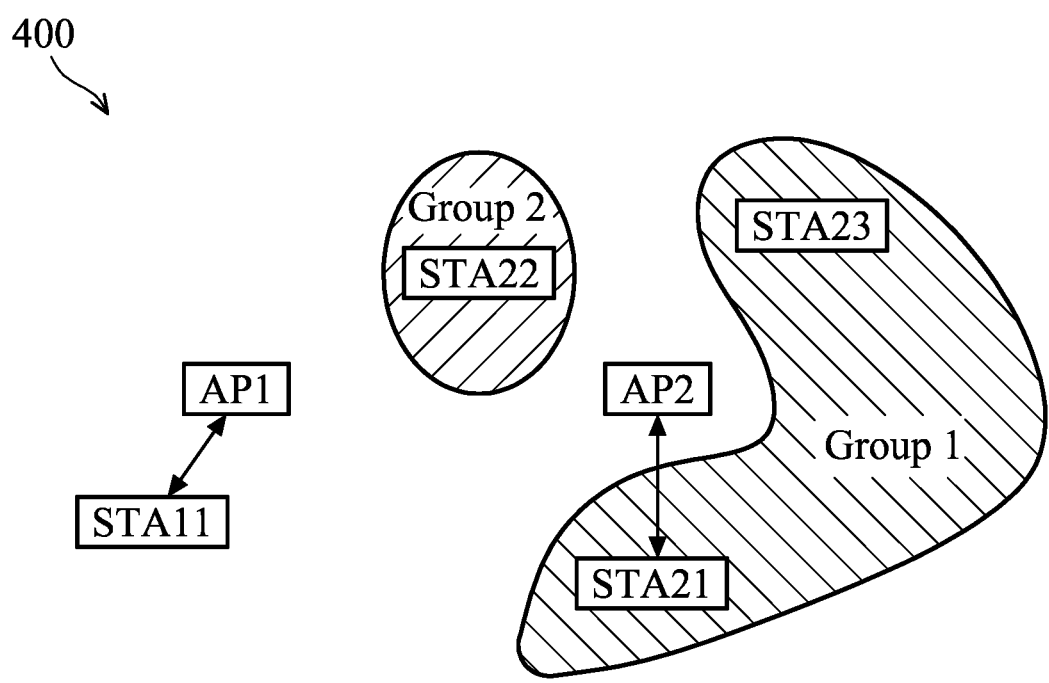

FIG. 4A is a diagram illustrating overlapping BSSs operating on the same wireless channel using coordinated spatial reuse in accordance with an embodiment of the disclosure. FIG. 4B is a diagram illustrating exchanging the cross-BSS RSSI measurement information between the access points AP1 and AP2 in accordance with the embodiment of FIG. 4A. FIGS. 4C-4E are diagrams of group classification of stations in accordance with the embodiment of FIG. 4A.

In yet another embodiment, the stations (STAs) communicate with the nearest access point (AP) in the mesh network 400 shown in FIG. 4. Specifically, the access point AP1 communicates with the station STA11 in BSS 405, and the access point AP2 communicates with the stations STA21, STA22, and STA23 in BSS 410, where BSS 405 is different from BSS 410. For example, the mesh network 400 may support the IEEE 802.11ax (Wi-Fi 6) protocol. The stations STA11 and STA21-STA23 may be all or part of the stations that are located within the range of the access points AP1 and AP2. The access points AP1-AP2 and stations STA11 and STA21-STA23 may include wireless routers, laptops, desktop computers, smartphones, tablet PCs, etc. Although FIG. 4 shows two access points and four stations, one of ordinary skill in the art will readily recognize that there could be any number of access points and stations, and such numbers would be within the spirit and scope of the disclosure.

In the embodiment, each of the access points AP1 and AP2 may measure RSSI information of each cross-BSS link between the AP and each associated/non-associated non-AP STA. For example, with regard to BSS 405, the station STA11 is a station associated with the access point AP1, and the stations STA21, STA22, and STA23 are non-associated non-AP STAs because these stations are in BSS 410 which is an OBSS of BSS 405. In addition, with regard to BSS 410, the stations STA21, STA22, and STA23 are non-AP STAs associated with the access point AP2, and the station STA11 is a non-AP STA because it is in BSS 405 which is an OBSS of BSS 410.

In some embodiments, the access points AP1 and AP2, and stations STA11 and STA21-STA23 do not need to support the IEEE 802.11k protocol to obtain information to discover the best available access point. For example, the access point AP1 may measure the RSSI information from the control frame, management frame or data frame sent from each of associated STAs (e.g., STA11) and non-associated STAs (e.g., STA21-STA23) so as to build a first cross-BSS RSSI measurement report. Similarly, the access point AP2 may measure the RSSI information from the control frame, management frame or data frame sent from each of associated STAs (e.g., STA21-STA23) and non-associated STA (e.g., STA11) so as to build a second cross-BSS RSSI measurement report. Once the first cross-BSS RSSI measurement report and the second cross-BSS RSSI measurement report are built, the access points AP1 and AP2 will exchange the first cross-BSS RSSI measurement report and the second cross-BSS RSSI measurement report, as shown in FIG. 4B.

After the access points AP1 and AP2 have obtained the first cross-BSS RSSI measurement report and the second cross-BSS RSSI measurement report, each of the access points AP1 and AP2 can start classifying types of the associated STAs according to the first cross-BSS RSSI measurement report or the second cross-BSS RSSI measurement report, and deliver classification RSSI information to the other access point. For example, the access point AP1 can calculate the RSSI difference of each non-associated STAs (e.g., STA21-STA23) according to the first RSSI measurement report and the second RSSI measurement report. Then, the access point AP1 can calculate the SR SINR of each non-associated STA (e.g., STA21-STA23) with specific Tx power, thereby building a first mapping table of SINRs. Similarly, the access point AP2 can calculate the RSSI difference of each non-associated STAs (e.g., STA1) according to the first RSSI measurement report and the second RSSI measurement report. Then, the access point AP2 can calculate the SR SINR of each non-associated STA (e.g., STA11) with specific Tx power, thereby building a second mapping table of SINRs. In addition, the access point AP2 can classify its associated STAs (e.g., STA21-STA23) into groups (e.g., Group 1 and Group 2) whether they can be spatial reused or not.

For example, with regard to the stations STA21 and STA23, since they are located farther away from the access point AP1, and thus the SINRs the existing links between the station STA21 and the access point AP2, and between the station STA23 and the access points AP2 will be less likely to be serious affected when the access point AP1 uses a SR link to transmit data to its associated station STA11. Thus, the access point AP2 may classify the stations STA21 and STA23 as Group 1. With regard to the station STA22, which is associated the access point AP2, is located between the access points AP1 and AP2, and thus the SINR of the exiting link between the access point AP2 and the station STA22 will be affected seriously when the access point AP1 uses a SR link to transmit data to its associated station STA11. Thus, the access point AP may classify the station STA22 as Group 2, as shown in FIG. 4C.

Specifically, Group 1 within the access point AP2's BSS is allowed to be spatial reused by the access point AP1, and Group 2 within the access point AP2's BSS is not allowed to be spatial reused by the access point AP1. Using the grouping process, the access point AP2 can obtain a second classification mapping table which records the groups and their attribute (e.g., whether they can be spatial reused or not) within the BSS used by the access point AP2.

Since the access point AP1 has only one associated station STA11 in this embodiment, the grouping process of the station(s) associated with the access point AP1 is not required here. However, the access point AP1 will also perform a similar grouping process to obtain a first classification mapping table if more stations are associated with access point AP1. Moreover, the access points AP1 and AP2 will exchange the first classification mapping table and the second classification mapping table. Therefore, the access point AP1 can determine its SR Tx power to avoid interfering the data transmission between the access point AP2 and its associated station based on the classification information (e.g., including the first classification mapping table and the second classification mapping table).

Afterwards, the access point AP2 may send a PPDU to one of its associated STAs (e.g., STA21-STA23), such as the station STA21, as shown in FIG. 4D. At this time, the access point AP1 can detect that this PPDU is sent from the access point AP2 and it matches the classification information which is defined by pre-negotiated rules. Thus, the access point AP1 can keep detecting whether there is spatial reuse opportunity to transmit data to its associated station (e.g., STA11) via the SR link. Once the access point AP1 detects that there is opportunity to transmit data to its associated station (e.g., STA11) via spatial reuse, the access point AP1 may search the classification mapping table for how to perform user selection and how to perform Tx power control. Specifically, if the access point AP1 finds that data transmission via the SR link may affect a group of users (e.g., non-associated stations) according to the classification mapping table, the access point AP1 may perform transmit power control to set the target transmit power to satisfy the minimum SINR required for all users in the group. If the access point AP1 finds that the data transmission via the SR link may affect a single user (e.g., one of the non-associated stations) according to the classification mapping table, the access point AP1 may perform transmit power control to set the target transmit power to satisfy a target SINR of the single user that is calculated from the RSSI differences of this single user. Therefore, according to the exchanged classification information, the access points AP1 and AP2 can perform non-triggered based spatial reuse without interfering each other.

Figure 5:
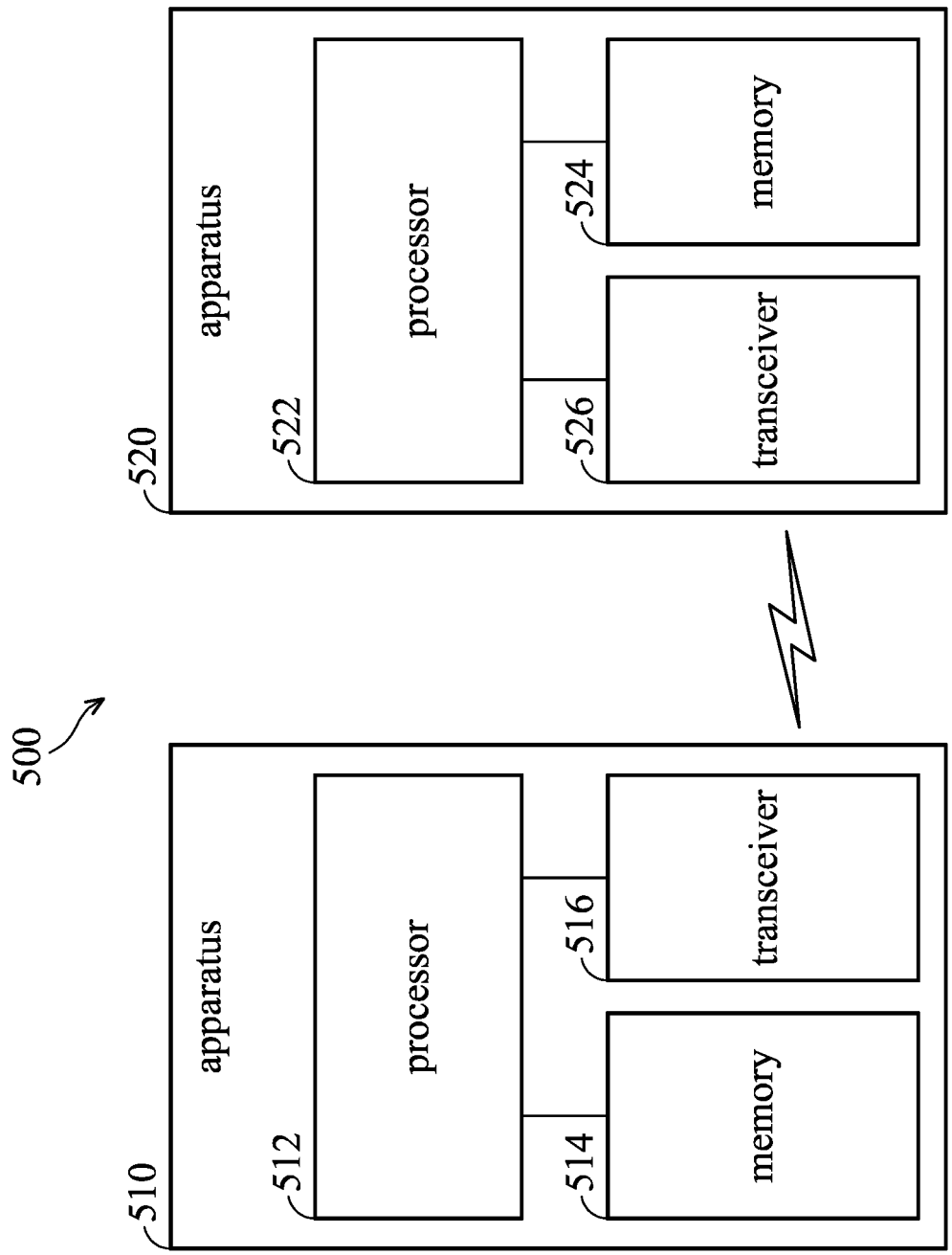
FIG. 5 is a block diagram of example communication devices in accordance with an implementation of the present disclosure.

FIG. 5 is a block diagram of example communication devices in accordance with an implementation of the present disclosure In FIG. 5, the communication environment 500 includes an example device 510 and an example device 520 in accordance with an implementation of the present disclosure. Each of device 510 and device 520 may perform various functions to implement schemes, techniques, processes and methods described herein pertaining to performing cross-BSS non-triggered based spatial reuse, including various scheme described above in FIGS. 2 (include FIGS. 2A and 2B) to 4 (include FIGS. 4A to 4E).

Each of device 510 and device 520 may be a part of an electronic apparatus, which may be a portable or mobile apparatus, a wearable apparatus, a wireless communication apparatus or a computing apparatus. For instance, each of device 510 and device 520 may be implemented in an access point (AP), a repeater, a smartphone, a smartwatch, a personal digital assistant, a digital camera, or a computing equipment such as a tablet computer, a laptop computer or a notebook computer. Each of device 510 and device 520 may also be a part of a machine type apparatus, which may be an IoT or NB-IoT apparatus such as an immobile or a stationary apparatus, a home apparatus, a wire communication apparatus or a computing apparatus. For instance, each of device 510 and device 520 may be implemented in a smart thermostat, a smart fridge, a smart door lock, a wireless speaker or a home control center. Alternatively, each of device 510 and device 520 may be implemented in the form of one or more integrated-circuit (IC) chips such as, for example and without limitation, one or more single-core processors, one or more multi-core processors, or one or more complex-instruction-set-computing (CISC) processors. Each of device 510 and device 520 may include at least some of those components shown in FIG. 5 such as a processor 512 and a processor 522, respectively. Each of device 510 and device 520 may further include one or more other components not pertinent to the proposed scheme of the present disclosure (e.g., internal power supply, display device and/or user interface device), and, thus, such component(s) of each of device 510 and device 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including implementation of performing cross-BSS non-triggered based spatial reuse in accordance with various implementations of the present disclosure.

In some implementations, device 510 may also include a transceiver 516 as a communication device coupled to processor 512 and configured to wirelessly transmit and receive data. In some implementations, device 510 may further include a memory 514 coupled to processor 512 and capable of being accessed by processor 512 and storing data therein. In some implementations, device 520 may also include a transceiver 526 as a communication device coupled to processor 522 and configured to wirelessly transmit and receive data. In some implementations, device 520 may further include a memory 524 coupled to processor 522 and capable of being accessed by processor 522 and storing data therein. Accordingly, device 510 and device 520 may wirelessly communicate with each other via transceiver 516 and transceiver 526, respectively.

To aid better understanding, the following description of the operations, functionalities and capabilities of each of device 510 and device 520 is provided in the context of device 510 acting as an access point (e.g., AP1 and AP2) and device 520 acting as a station (e.g., STA11, and STA21-STA23) of a mesh network (e.g., mesh network 400).

Figure 6:
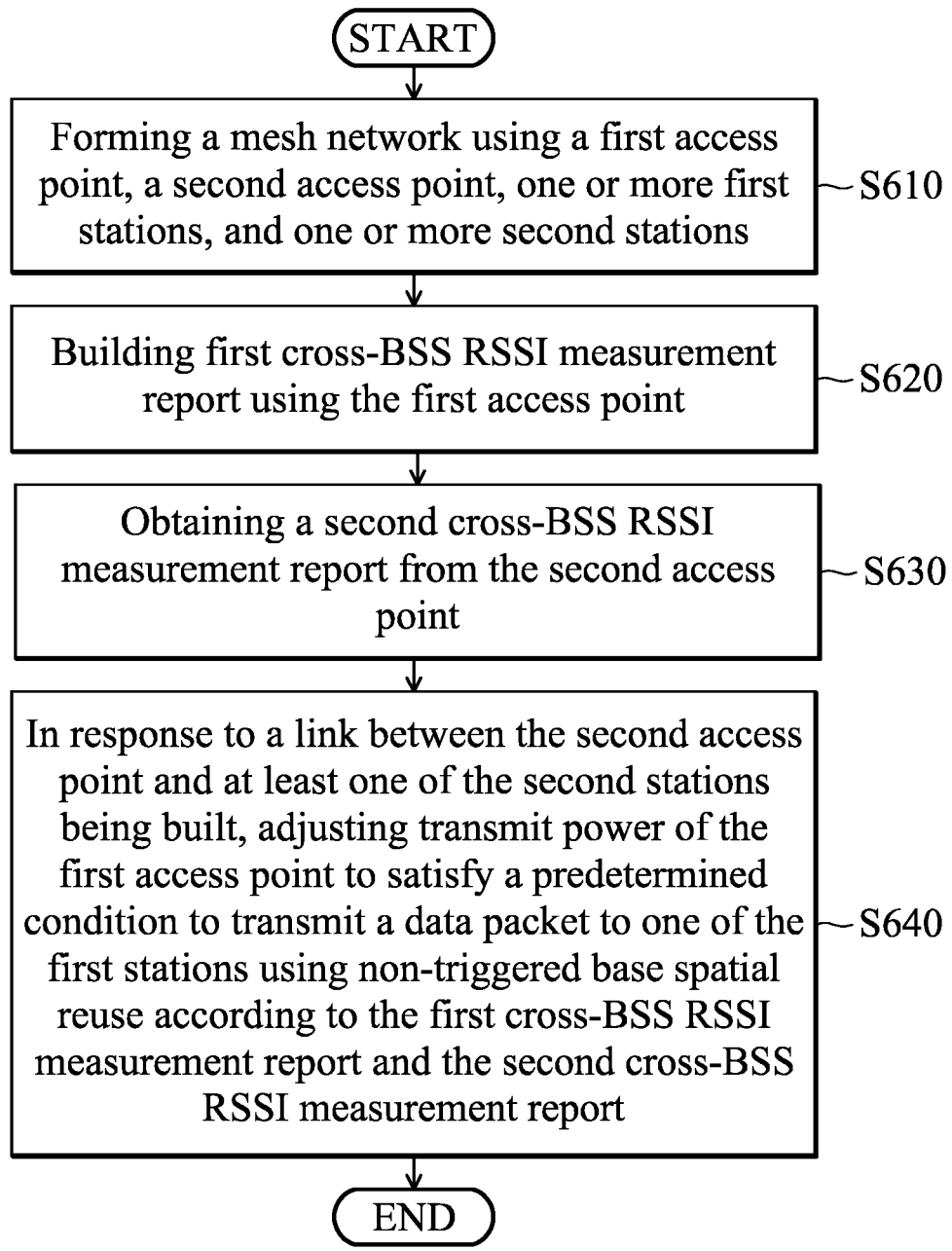
FIG. 6 is a flow chart of a method for performing cross-BSS non-triggered based coordinated spatial reuse in accordance with an embodiment of the disclosure.

FIG. 6 is a flow chart of a method for performing cross-BSS non-triggered based coordinated spatial reuse in accordance with an embodiment of the disclosure. Please refer to FIG. 4A and FIG. 6.

Step S610: forming a mesh network using a first access point, a second access point, one or more first stations, and one or more second stations. For example, the first access point (e.g., AP1) is connected to the one or more first stations (e.g., STA11) and the second access point (e.g., AP2). The second access point is connected to the one or more second stations (e.g., STA21-STA23).

Step S620: building first cross-BSS RSSI measurement report using the first access point. For example, the first access point measures first RSSI information from a management frame, a control frame or a data frame sent from each first station and each second station to build the first cross-BSS RSSI measurement report.

Step S630: obtaining a second cross-BSS RSSI measurement report from the second access point. For example, in addition to building the first cross-BSS RSSI measurement report, the first access point may obtain the second cross-BSS RSSI measurement report from the second access point. Similarly, the second access point measures second RSSI information from a management, a control frame or a data frame sent from each first station and each second station to build the second cross-BSS RSSI measurement report.

Step S640: in response to a link between the second access point and at least one of the second stations being built, adjusting transmit power of the first access point to satisfy a predetermined condition to transmit a data packet to one of the first stations using non-triggered base spatial reuse according to the first cross-BSS RSSI measurement report and the second cross-BSS RSSI measurement report. For example, the link between the second access point and the at least one of the second stations can be regarded as an existing link. The first access point can find whether there is opportunity for spatial reuse over the existing link. Once the first access point find that there is opportunity for spatial reuse over the existing link, the first access point will adjust the transmit power of its transceiver to transmit a data packet (e.g., a PPDU or an A-MPDU) to its associated station (e.g., STA11) using spatial reuse (i.e., the SR link), so that a target SINR of the existing link can be satisfied, and the interference to the existing link caused by the SR link can be prevented.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any device that can contain, store, communicate, propagate, or transport the program for use by or in connection with the instruction execution system, device, or device.

The medium may be an electronic, magnetic, optical, electromagnetic, infrared, semiconductor system (or device or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device, comprising:
a transceiver, connecting the device to one or more first stations and an access point, wherein the access point is connected to one or more second stations; and
a processor, coupled to the transceiver and configured to perform operations comprising:
building a first cross-BSS (basic service set) RSSI (received signal strength indication) measurement report;
obtaining a second cross-BSS RSSI measurement report from the access point; and
in response to a link between the access point and at least one of the second stations being built, adjusting transmit power of the transceiver to satisfy a predetermined condition to transmit a data packet to one of the first stations using non-triggered base spatial reuse according to the first cross-BSS RSSI measurement report and the second cross-BSS RSSI measurement report.

2. The device as claimed in claim 1, wherein the device and the first stations belong to a first BSS (basic service set), and the access point and the second stations belong to a second BSS, and the first BSS is different from the second BSS.

3. The device as claimed in claim 1, wherein the processor measures first RSSI information from a management frame, a control frame or data frame sent from each first station and each second station to build the first cross-BSS RSSI measurement report,
wherein the access point measures second RSSI information from a management, a control frame or data frame sent from each first station and each second station to build the second cross-BSS RSSI measurement report.

4. The device as claimed in claim 1, wherein the device and the access point exchange the first cross-BSS RSSI measurement and the second cross-BSS RSSI measurement report with each other.

5. The device as claimed in claim 1, wherein the access point classifies the second stations into one or more groups based on whether the second stations are available for spatial reuse or not to build a classification mapping table.

6. The device as claimed in claim 5, wherein in response to a link between the access point and one of the groups being built, the access point sends the data packet to the second station.

7. The device as claimed in claim 6, wherein when the processor detects that the data packet is sent from the access point to the group having two or more of the second stations, the processor adjusts the transmit power of the transceiver to achieve a minimum SINR (signal-to-interference plus noise ratio) required for all users in the group.

8. The device as claimed in claim 7, wherein when the processor detects that the data packet is sent from the access point to the group having one of the second stations, the processor adjusts the transmit power of the transceiver to satisfy a target SINR of a single user in the group, and the target SINR is calculated using RSSI differences of the single user.

9. The device as claimed in claim 8, wherein the data packet is a PPDU (physical layer protocol data unit) or an A-MPDU (aggregate MAC protocol data unit).

10. A method, comprising:
forming a mesh network using a first access point, a second access point, one or more first stations, and one or more second stations, wherein the first access point is connected to the one or more first stations and the second access point, and the second access point is connected to the one or more second stations;
building a first cross-BSS (basic service set) RSSI (received signal strength indication) measurement report using the first access point;
obtaining a second cross-BSS RSSI measurement report from the second access point; and
in response to a link between the second access point and at least one of the second stations being built, adjusting transmit power of the first access point to satisfy a predetermined condition to transmit a data packet to one of the first stations using non-triggered base spatial reuse according to the first cross-BSS RSSI measurement report and the second cross-BSS RSSI measurement report.

11. The method as claimed in claim 10, wherein the first access point and the first stations belong to a first BSS (basic service set), and the second access point and the second stations belong to a second BSS, and the first BSS is different from the second BSS.

12. The method as claimed in claim 10, further comprising:
utilizing the first access point to measure first RSSI information from a management frame, a control frame or a data frame sent from each first station and each second station to build the first cross-BSS RSSI measurement report; and
utilizing the second access point to measure second RSSI information from a management, a control frame or a data frame sent from each first station and each second station to build the second cross-BSS RSSI measurement report.

13. The method as claimed in claim 10, wherein the device and the access point exchange the first cross-BSS RSSI measurement and the second cross-BSS RSSI measurement report with each other.

14. The method as claimed in claim 10, further comprising:
utilizing the second access point to classify the second stations into one or more groups based on whether the second stations are available for spatial reuse or not to build a classification mapping table.

15. The method as claimed in claim 14, further comprising:
in response to a link between the second access point and one of the groups being built, utilizing the second access point to send the data packet to the second station.

16. The method as claimed in claim 15, further comprising:
when the first access point detects that the data packet is sent from the second access point to the group having two or more of the second stations, utilizing the first access point to adjust a transmit power of the first access point to achieve a minimum SINR (signal-to-interference plus noise ratio) required for all users in the group.

17. The method as claimed in claim 16, further comprising:
when the first access point detects that the data packet is sent from the second access point to the group having one of the second stations, utilizing the first access point to adjust the transmit power of the first access point to satisfy a target SINR of a single user in the group, and the target SINR is calculated using the RSSI differences of the single user.

18. The method as claimed in claim 17, wherein the data packet is a PPDU (physical layer protocol data unit) or an A-MPDU (aggregate MAC protocol data unit).

19. A device, comprising:
- a transceiver, connecting the device to one or more first stations and an access point, wherein the access point is connected to one or more second stations; and
- a processor, coupled to the transceiver and configured to perform operations comprising:
- measuring first RSSI information from a management frame or a control frame or a data frame sent from each first station and each second station to build a first cross-BSS RSSI measurement report;
- exchanging the first cross-BSS RSSI measurement report and a second cross-BSS RSSI measurement report between the device and the access point; and
- in response to an opportunity to perform spatial use being found by the processor, adjusting a transmit power of the transceiver to satisfy a predetermined condition to transmit a data packet to one of the first stations using non-triggered base spatial reuse according to the first cross-BSS RSSI measurement report and the second cross-BSS RSSI measurement report.

20. The device as claimed in claim 19, wherein the device and the first stations belong to a first BSS (basic service set), and the access point and the second stations belong to a second BSS, and the first BSS is different from the second BSS.

* * * * *